US006663371B2

United States Patent
Curl

(10) Patent No.: US 6,663,371 B2
(45) Date of Patent: *Dec. 16, 2003

(54) WINDSHIELD AND WINDOW REPAIR ASSEMBLY

(76) Inventor: Michael Jeffrey Curl, 560 Walnut St., Apt. 123, Monroe, WI (US) 53566

( * ) Notice: Subject to any disclaimer, the term of this patent is extended or adjusted under 35 U.S.C. 154(b) by 132 days.

This patent is subject to a terminal disclaimer.

(21) Appl. No.: 10/040,676

(22) Filed: Dec. 29, 2001

(65) Prior Publication Data

US 2002/0058080 A1 May 16, 2002

Related U.S. Application Data

(63) Continuation-in-part of application No. 09/568,345, filed on May 10, 2000.
(60) Provisional application No. 60/166,723, filed on Nov. 22, 1999, and provisional application No. 60/181,279, filed on Feb. 9, 2000.

(51) Int. Cl.[7] .............................................. B32B 35/00
(52) U.S. Cl. ..................... 425/12; 425/13; 249/103; 156/94; 264/36.21
(58) Field of Search .............................. 425/11, 12, 13; 264/36.1, 36.21, 102; 249/103, 140; 156/94

(56) References Cited

U.S. PATENT DOCUMENTS

| 3,993,520 | A | | 11/1976 | Werner et al. ................ 156/94 |
|---|---|---|---|---|
| 4,047,863 | A | * | 9/1977 | McCluskey et al. ........... 425/13 |
| 4,681,520 | A | | 7/1987 | Birkhauser, III ............... 425/12 |
| 4,775,305 | A | | 10/1988 | Alexander et al. ............. 425/12 |
| 4,776,780 | A | | 10/1988 | Banks ........................... 425/12 |
| 4,995,798 | A | | 2/1991 | Ameter .......................... 425/12 |
| 5,116,441 | A | * | 5/1992 | Campfield, Jr. ............... 156/94 |
| 5,234,325 | A | | 8/1993 | Hill ............................... 425/12 |
| 5,372,761 | A | | 12/1994 | Anderson, Sr. ........... 264/36.21 |
| 5,425,827 | A | * | 6/1995 | Campfield ..................... 156/94 |
| 5,429,692 | A | * | 7/1995 | Campfield ................... 264/136 |
| 5,589,018 | A | * | 12/1996 | Campfield ..................... 156/94 |
| 5,591,460 | A | | 1/1997 | Wanstrath et al. ............. 425/12 |
| 5,614,046 | A | * | 3/1997 | Campfield ..................... 156/94 |
| 5,635,116 | A | | 6/1997 | Einiger et al. ............ 264/36.21 |
| 5,897,882 | A | | 4/1999 | Gonzalez ....................... 425/12 |
| 5,954,901 | A | | 9/1999 | Henderson ................ 156/275.5 |
| 6,050,799 | A | | 4/2000 | Galyon .......................... 425/12 |

* cited by examiner

Primary Examiner—Robert Davis
Assistant Examiner—Joseph S Del Sole

(57) ABSTRACT

An assembly held down with suction cups repairs damage to an automobile windshield and the like. The rod of an extrusion assembly pushes liquefied resin through the interior of a tube and out the end thereof into the damaged area. The tube, jacketed by a vacuum container supplied by a vacuum pump, may be advanced to tightly contact a compression grommet shaped to seal off part of the vacuum created therein. Once that is done, partial withdrawal of the extrusion rod strengthens the vacuum. Certain obstructions, or stops, are situated to prevent damage to the windshield which might otherwise occur if the assembly were advanced too tightly against the windshield.

20 Claims, 9 Drawing Sheets

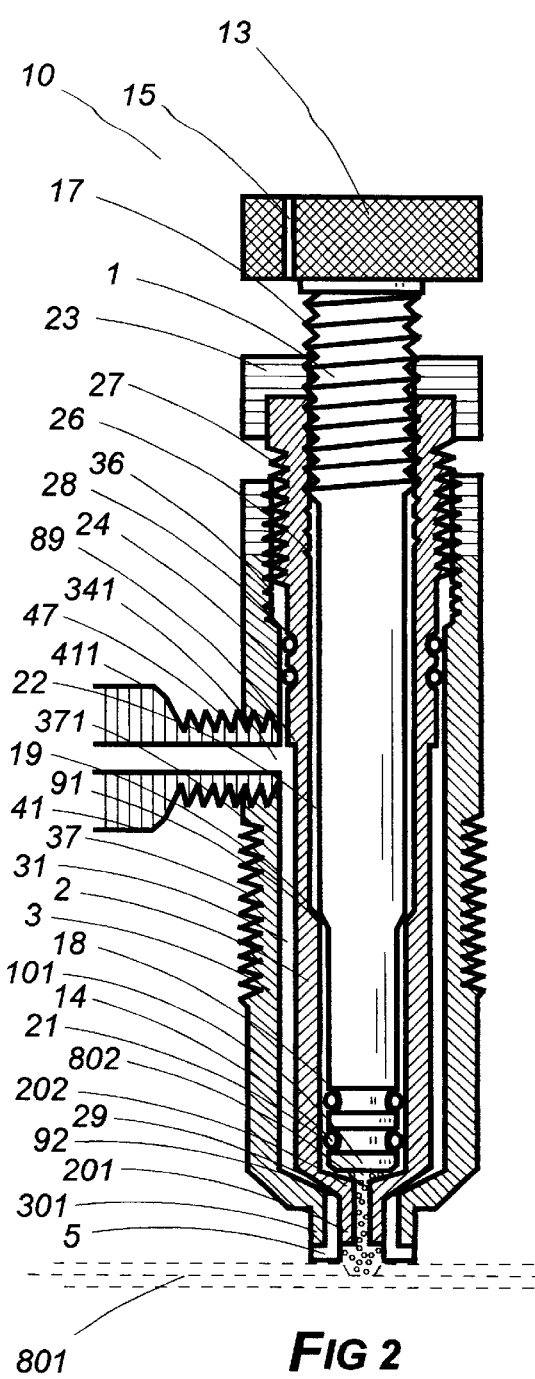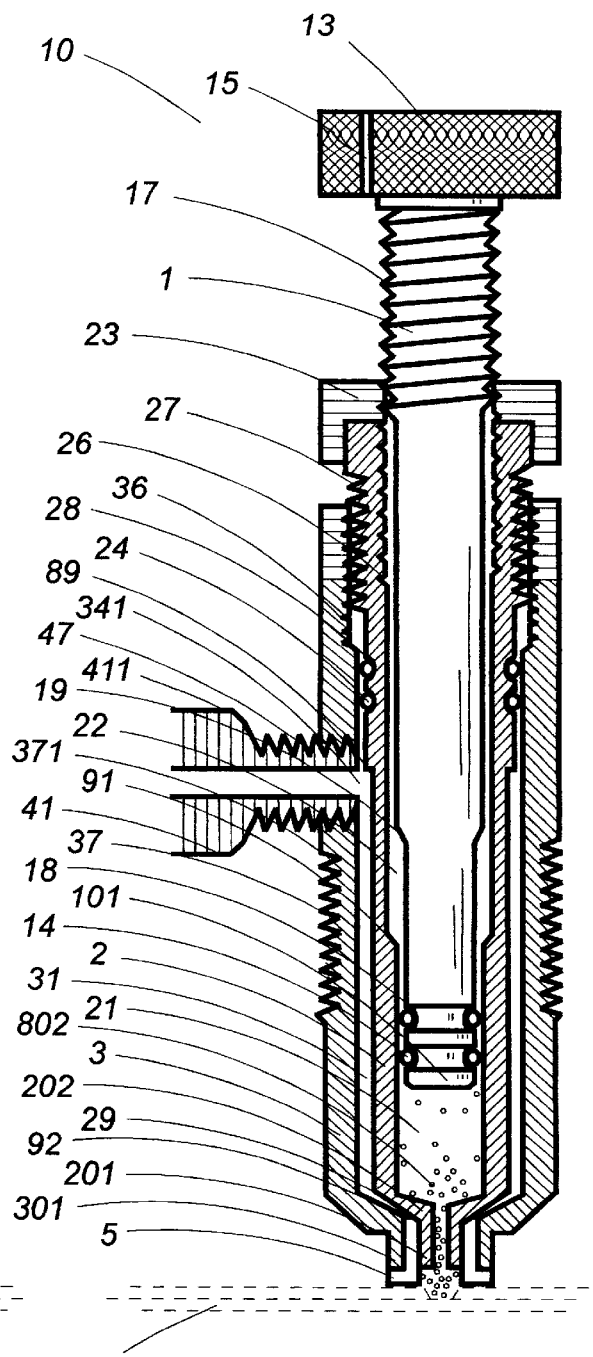

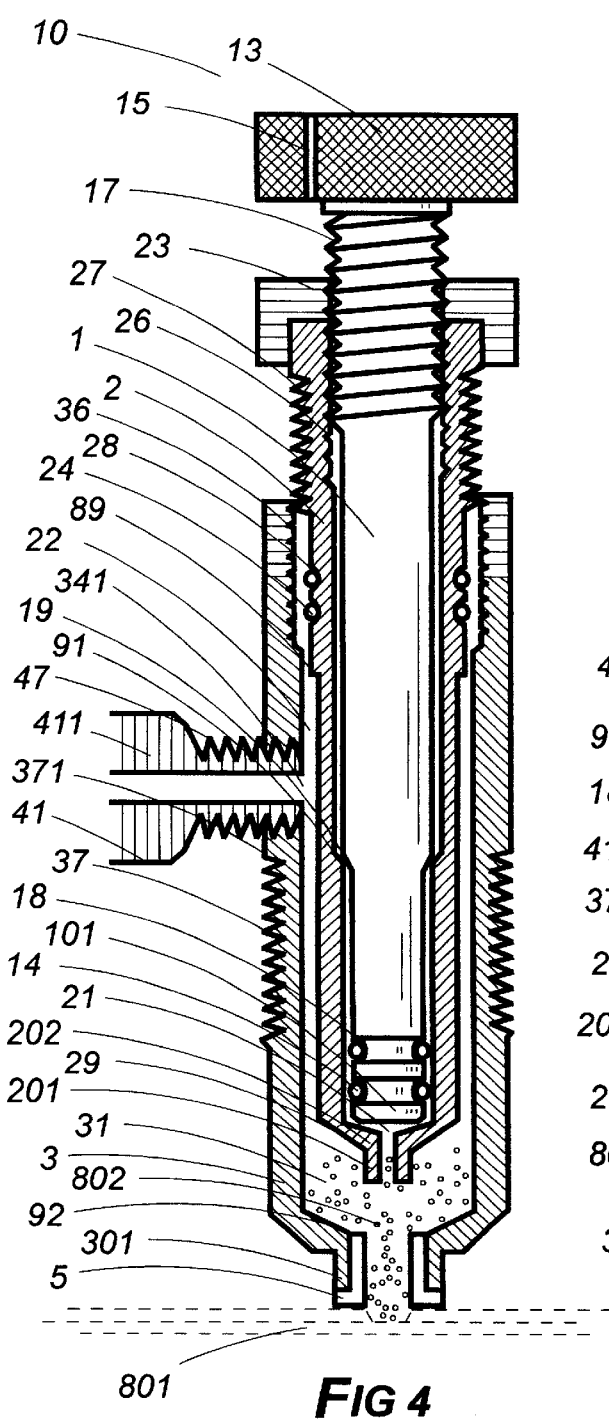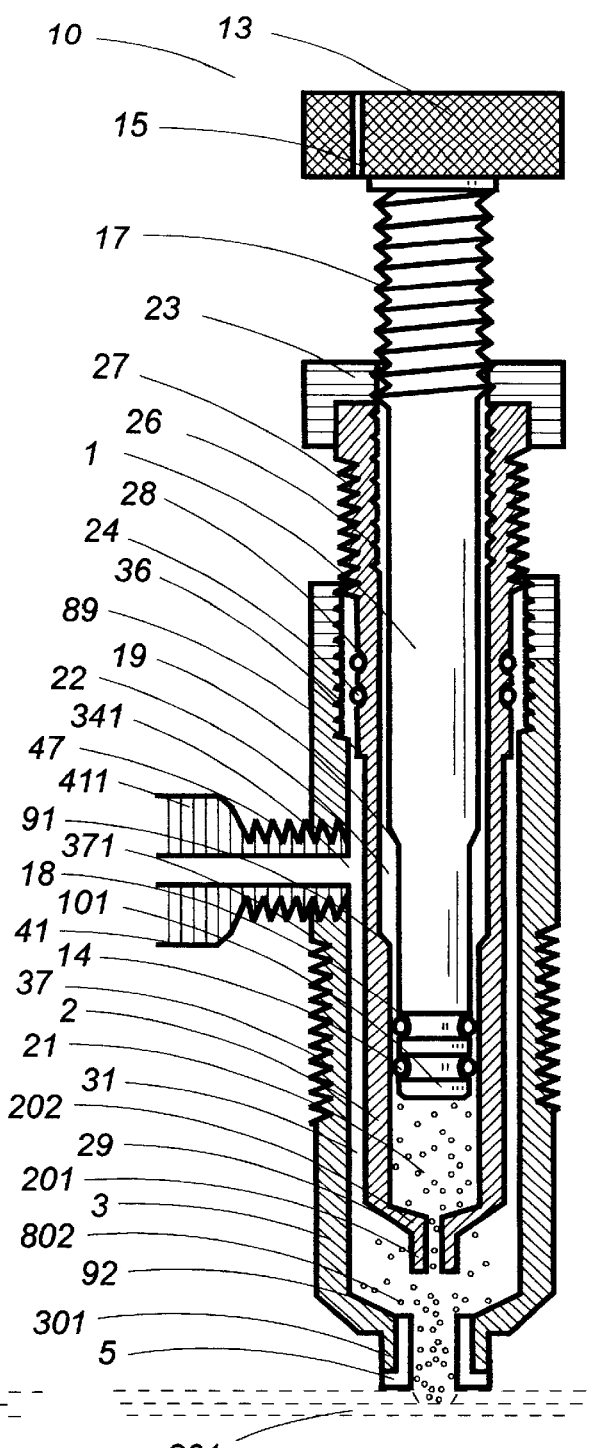

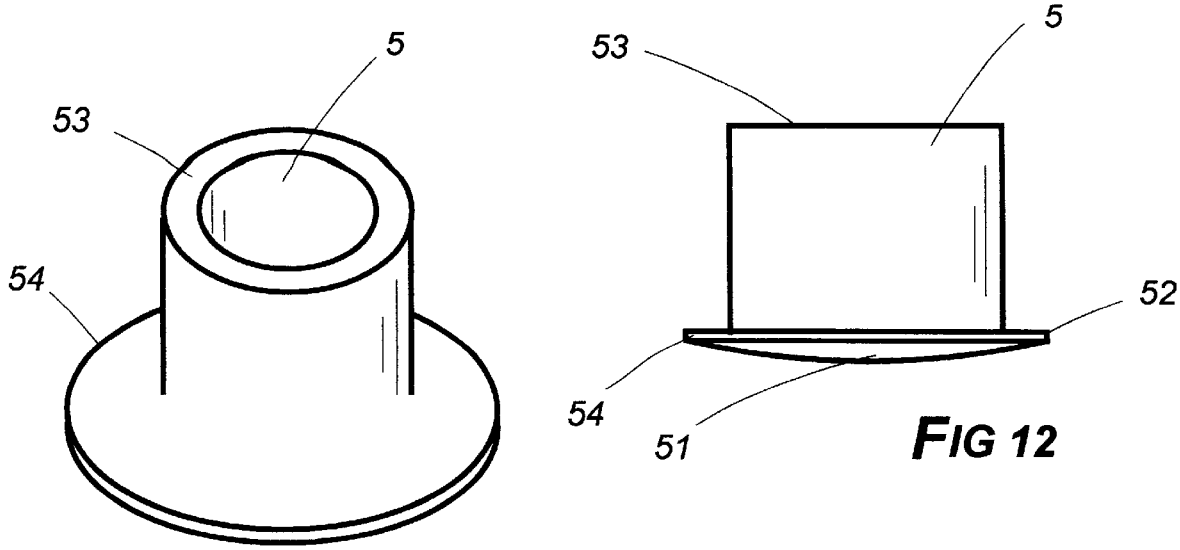
FIG 11
FIG 12
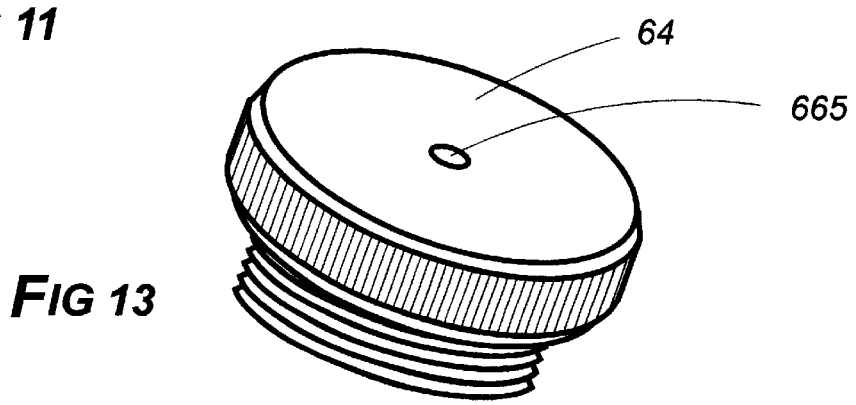
FIG 13
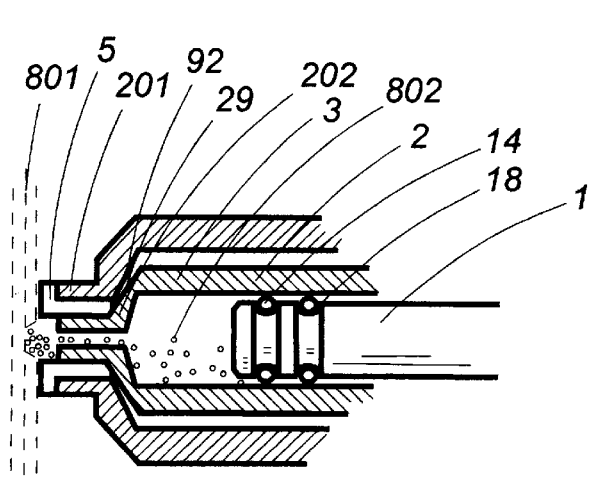
FIG 15
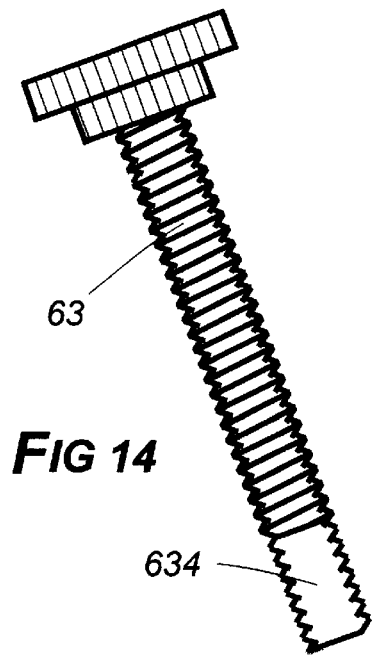
FIG 14

WINDSHIELD AND WINDOW REPAIR ASSEMBLY

This instrument, filed under 37 CFR 1.53(b) and 1.78, invoking the provisions of 35 U.S.C. 120, is a Continuation in Part of presently copending application Ser. No. 09/568,345 entitled "Windshield and Gloss Repair Device and Methods", filed May 10, 2000 derived from Provisional Applications Nos. 60/166,723 filed Nov. 22, 1999 and 60/181,279 filed Feb. 9, 2000 both entitled "Windshield and Vertical Glass Apparatus and Crack Apparatus",

BACKGROUND OF THE INVENTION

1. Field of the Invention

Auto windshield repair; glass repair

2. Description of the Prior Art

Occasionally a descriptive term in this application may be shortened so as to recite only a part rather than the entirety thereof as a matter of convenience and to avoid needless redundancy. In instances in which that is done, applicant intends that the same meaning be afforded each manner of expression. Thus, the term extruding rod reference mark (15) might be used in one instance but in another, if meaning is otherwise clear from context, expression might be shortened to rod reference mark (15) or merely mark (15). Any of those forms is intended to convey the same meaning.

The term attach or fasten or any of their forms when so used means that the juncture is of a more or less permanent nature, such as might be accomplished by nails, screws, welds or adhesives. Thus, it is stated herein that the vacuum attachment conduit (411), by reason of an adhesive applied to its (411) threads, is attached to the vacuum container (3). A connection in which one object is easily removed from another is described by the word emplace, as where it is stated herein that a first end of the compression grommet (5) is emplaced within the end of the vacuum container (3). A connection in which two objects, although not attached could be separated only with considerable difficulty is referred to herein as one of rigid emplacement. The interthreading of the platform stabilizing pin (63) into the opening (631) dedicated to such purpose in the apparatus platform (6) is stated herein to be such a connection. Employment of the words connector or join or any of their forms is intended to include the meaning of any of those terms in a more general way. The meaning in the respective cases is clear from context, however. Accordingly, modifying words to clarify which of the two uses is the intended one seem unnecessary.

The word comprise may be construed in any one of three ways herein. A term used to describe a given object is said to comprise it, thereby characterizing it with what could be considered two-way equivalency in meaning for the term. Thus, it is stated that the vacuum producing assembly (410) comprises the apparatus which provides the vacuum used by the invention. The term comprise may also be characterized by what might be considered one-way equivalency, as when it is stated herein that vacuum attachment conduit (411) is disposed to comprise a radial interference projection (41) of the assembly, meaning that in the given instance, that object (411) is itself (411) the projection (41). This use of the word has a generic sense to it. That is, the vacuum attachment conduit (411) will always be a rotation track (14) but a radial interference projection (41) may be an attachment conduit (411) in one case but something else in another. However, the word comprise may also be used to describe a feature which is part of the structure or composition of a given object. Thus, the resin extrusion assembly (10) is stated to comprise, among other things, a compression grommet (5) as a component thereof. The meaning in the respective cases is clear from context, however. Accordingly, modifying words to clarify which of the three uses is the intended one seem unnecessary.

Terms relating to physical orientation such as top or bottom, upper or lower, refer to the positioning of the assembly in the manner it would be observed if repairs were being made upon a horizontally disposed substrate (801) such as a windshield laid out upon a workbench. This convention has been adopted as a matter of convenience in discussing orientation and as shown in the drawings, the turning knobs (13, 23) are regarded as being at the top of the structures (1, 2) which comprise them (13, 23) and the applicating end of the extrusion assembly (10), at the bottom thereof (10). The use of the terms in this manner must, of course, be interpreted so as to be equally understood regardless of what attitude the assembly is positioned—such as, for example, if it were oriented horizontally outward such as for vertical repair to a plate glass window.

The term longitudinal refers to generally elongated configuration. Thus, the components of the extrusion assembly (10) are all stated to comprise what is described herein as longitudinal extension.

Certain words have been coined herein to simplify discussion. In some cases, a noun is converted to a verb or adjective. For example, the portion of the extruding rod (1) which by reason of its proximity to the damage site forces the resin (802) toward it through the extruding tunnel (22) is designated its applicating end (101), in convenient derivation from the noun application. Similarly, coengage and interthread are terms frequently applied to describe the relationship of several threaded objects considered herein which are merely screwed together in some manner. Their meanings are explained ante. References herein to pneumatic communication refer to a passageway either for vacuum or air.

In the historical development of devices addressing transparent substrate (801) repair such as that upon automobile windshields, liquified resin (802)—generally referred to merely as resin (802) herein—is transferred into the damage site. The resin (802) comprises refractive properties which, provided the repair is carefully made, afterwards make it unnoticeable within the site. It was early learned that resin (802) prematurely applied to the damage site tended to trap any moisture within it, contaminating the resin (802), altering its (802) refractive properties and weakening the repair. Best results were achieved if not only moisture but air was withdrawn from and kept out of the site. Various vacuum arrangements were contemplated and attempted. Ultimately, it was also learned that the application of heat—even from such as a hair dryer focused upon the damage from above or a cigarette lighter underneath—enhanced repair and speeded up the process. Shielding from ultra-violet rays inherent in sunlight—or, perhaps, working at night—also avoided curing the resin (802) prematurely. Other tricks also emerged, such as covering a large damaged area with adhesive tape or a plastic stencil-like template and making only a small opening in the covering so as to limit the repair site to a manageable area. Nonetheless, it was difficult to conceive and construct an assembly which would conveniently vacuum out a site, leave the vacuum in place to prevent the further intrusion of air, apply the resin (802) to the site and withdraw ever-present residual air from the emplaced resin (802) with, perhaps, additional vacuuming means. One need not cogitate at length to realize that once the initial vacuum has been established, it will likely be lost upon emplacing the resin (802). Preliminary emplacement of the resin (802) would also probably complicate creation of the vacuum without fouling up the entire mechanism. There are, of course, other objectives also worthy of consideration in transparent substrate (801) repair. The significance of what is focused upon here, however, is best understood in terms of the field's history.

U.S. Pat. No. 3,993,520 issued to Werner, et al operated without an external vacuum producing assembly (410) and accordingly, created no primary vacuum, as that terminology is used herein. The device essentially forced resin (802) into the damage site by means of an interthreading rod which at early stages was operated hydraulically as a ram and at later stages, pneumatically, such that it produced what is designated herein as a secondary vacuum upon its withdrawal.

U.S. Pat. No. 4,681,520 issued to Birkhauser, III, while wisely including certain pivot means to address platform support to accomplish repair proximate the curved part of a windshield, employed an external assembly operated by a toggle switch to merely shift functionality from vacuum producing to pneumatic pressurizing. U.S. Pat. No. 4,775,305 issued to Alexander, et al also employed alternately manual pump controlled vacuum and air pressure, involving chambers isolated from one another by valving.

U.S. Pat. No. 4,776,780 issued to Banks interestingly comprised an external vacuum producing mechanism which forced a suction cup in place to connect the device tightly to the windshield. The central portion of the suction cup, however, had a passageway disposed transversely through it and isolated from it within which an extruding rod and extrusion tube combination were disposed. While those two elements could have been instrumental in the creation of a secondary vacuum, as the term is expressed herein, by withdrawing the extruding rod, no primary vacuum to evacuate the air from the damage site was ever present. Moreover, although it would appear repairs might have been observed by an accomplice beneath the windshield, presumably, the holding suction cup masked them from above.

U.S. Pat. Nos. 5,116,441; 5,425,827; 5,429,692; 5,589,018; and 5,614,046 all issued to Campfield, Jr. and U.S. Pat. No. 5,954,901 issued to Henderson also employed merely an extruding rod and extrusion tube sans vacuum producing assembly (410) in which the resin (802) is forced into the repair site by ram, or hydraulic, action. As was the case with Einiger, et al, the claims of all except the 5,589,018 Campfield, Jr. patent were drafted to present solely a series of process steps rather than a product.

U.S. Pat. No. 5,234,325 issued to Hill did not rely upon a vacuum producing assembly (410) and, consequently, created no primary vacuum. Withdrawal of an extruding rod within an extrusion tube created merely what is designated herein to be a secondary vacuum. Resin (802) was emplaced over the damage site under ambient air—that is, non-vacuum—conditions through a separate conduit which could be opened and closed as necessary. Manipulation of the rod and tube alternately permitted vacuum production and pneumatically pressured application. It does not appear there could have been any way by which the resin (802) could have been first applied to the damage site under vacuum conditions—particularly those in which a stronger primary vacuum could have been present, since the only alternate route available was dedicated to loading the resin (802). A platform stabilizing pin (63) is also present.

U.S. Pat. No. 5,372,761 issued to Anderson, Sr. presents an admirable history of windshield repair device development. In the device of that patent, the resin (802) was stored in a small sponge disposed within the enclosure in which a vacuum was created manually within a special type of suction cup—although a separate vacuum producing assembly could obviously have been connected to the system. Various means were devised to squeeze the resin (802) from the sponge into the damage site. Repetitions in vacuum production and pneumatic pressure application were undertaken following resin (802) application. While this system permitted application of the resin (802) after the vacuum had been drawn, it would appear that the resin (802) supply, if insufficient, must have been replenished only with some difficulty. Further, by reason of a suction cup's broadened shape, there could have been no assurance the bulk of the resin (802) satisfactorily reached the intended target.

U.S. Pat. No. 5,591,460 issued to Wansrath was a computerized assembly which sensed and reported the strength of the vacuum generated, employing no more than vacuum and pneumatic alternating action within a tube to apply the resin (802) disposed therein.

U.S. Pat. No. 5,635,116 issued to Einiger, et al, in which the claims were cast not in product but in process form, represented a departure from the present line of history, involving merely the direct application of resin (802) to the damage site de hors any vacuum producing system (410) or supporting platform at all.

U.S. Pat. No. 5,897,882 issued to Gonzalez, featured an exterior vacuum producing assembly (410) which did not create what is designated herein to be a primary vacuum until the resin (802) had first been dropped into the damage site, wherein the unwanted air therein was drawn through the resin itself (802). Interesting, but less relevant herein were separate vacuum passageways, one of which ran to the supporting suction cup assembly.

U.S. Pat. No. 6,050,799 issued to Galyon proposed means to overcome shortcomings incurred with other devices merely by disposing the supporting platform nearer the damage site.

Along the course of the foregoing line of development, U.S. Pat. No. 4,995,798 issued to Ameter appears to have had the most foresight in providing for both a primary and secondary vacuum. By disposing three elongated members longitudinally concentric to comprise an merit worthy extrusion assembly, it became possible to dispose a jacketing vacuum within the most exterior container. The sought after primary vacuum could then produced at an early stage and the resin (802) thereafter allowed to descend into the damage site.

By reason of the particular structure of the Ameter device, however, both the extruding rod and the extrusion tube the rod was disposed in were required to be in place before the vacuum producing assembly (410) was engaged. That meant that the resin (802) itself also had to be first disposed therein; otherwise, the vacuum seal would have had to be broken to get it in there. Still, once in place, there is always the other matter of the resin's mucking up the works when the vacuum was turned on, supra. These difficulties were obviously recognized; hardly the subject of denial. To contend with them, the loci of resin (802) emplacement and vacuum extraction were as far removed from one another as practicable.

After loading the resin (802) into the Ameter device in fountain pen style, it (802) was withheld some distance upwards from the applicating ends of the extruding rod and extrusion tube while the vacuum was being drawn. The attachment site for the vacuum producing assembly (410), on the other hand, was disposed at a point very near the damage site—even beneath the supporting platform. Yet, a true vacuum could not safely be produced. To avoid dislodging resin (802), the vacuum had to be a very weak one—a "low static" one as it was termed therein. Even the pull of gravity must have exacerbated the problem. In the slightly lowered air pressure interior environment, the extruding rod was advanced to push the resin (802) into the site by ram, or hydraulic, action. Next disconnecting the vacuum and allowing ambient air to enter the system also assisted in forcing the resin (802) into its (802) intended site. Afterwards, the extruding rod could be manipulated to alternately apply pneumatic pressure upon the resin (802) and produce a secondary vacuum—albeit a progressively weakened one—within the extrusion tube. Ordinarily, little more could be done. However, the extruding rod was so configured that it could be advanced far into the damage site such as to conduct a "flexing" maneuver upon the residual cone of a "bull's eye break".

Because the attachment site for the vacuum producing assembly (410) was so low, it was necessary in the Ameter device to dispose openings in the compression grommet, part of the extrusion assembly which cushioned its contact with the windshield. Without them, the vacuum passageway would have been blocked.

Whether such openings in the Ameter grommets weakened their sealing action or wore them out prematurely must at least have been a matter of dispute. In any case, they may have been regarded as expendable or disposable items.

It clearly would have been advantageous if the Ameter device had permitted the creation of a stronger primary vacuum which could be relied upon to completely evacuate the damage site. Moreover, it is difficult to accept carte blanche the notion that the resin (802) did not contaminate the vacuum producing system to some extent however low powered the vacuum was limited in the process. It would also have been helpful if the device had permitted the feature addressing surface pressure avoidance and portability mentioned ante. Nonetheless, it is apparent that the Ameter assembly was well on its way as a forerunner in the development of an acceptable longitudinally concentric extrusion system and is deserving of recognition for such insight.

Surely, it must have been frustrating for those forerunners in development to meet the sought after objectives addressed here. Knowing what we have about plumbing mechanisms for nearly the past century, it is difficult to understand why it has taken so long to do so. What is obviously needed is a repair assembly which initially provides a strong vacuum for the purposes mentioned supra and which retains that vacuum while the repair resin (802) is emplaced within the system for injection. The resin (802) could then descend into the site assisted greatly by pull of the vacuum, allowing residual air bubbles to escape from it (802) into the pre-established vacuum.

The needed system should facilitate the vacuum provision phase of operation, conferring sufficient strength upon the vacuum to completely clean out the damage site. The cleansing action should be sufficiently complete to make it unnecessary to probe and tinker with the site's interior. Nor should it be necessary to compromise the integrity of the compression grommet. In the process, the system should permit essentially complete operable control over the preparatory phase and resin application process. A way should have been found to seal off what is designated herein as the primary vacuum, isolating a large part of the place in which it was created from a separate vacuum chamber in a more confined application area which might then be expanded to strengthen the vacuum to further purify the resin (802).

Almost equally important, for two good reasons, a way should have been found to draw and retain a primary vacuum away from the damage site. For one thing, doing so would avoid errant pressures against the surface of the substrate (802) potentially derived from either manually or mechanically produced vibrations associated with the pumping action. Nothing should be allowed to happen which unduly flexes the substrate (802) during its (802) repair. The drawing of the vacuum while the assembly is not touching the glass would, thus, assure just that much more in the way of quality control. For the second reason, such an alternative from the traditional would lend the assembly greater portability, as it were. Then the assembly parts could be prepared by providing the primary vacuum and loading the resin (802) at a separate place without having to encumber the work-site with bulky vacuum equipment. The vacuum would, in effect, be borrowed and carried where needed. The system should, thus, be designed so that one of the parts may be manipulated to seal off a primary vacuum chamber configured, once sealed by some interior part, to be entirely self contained so as not to depend upon any part of the underlying substrate (801) to serve as part of the vacuum wall. To take this notion to greater length, one might even visualize drawing the vacuum back at the shop perhaps, driving out to the place repairs are required and undertaking them with no more than the extrusion parts and the supporting frame. Any additional air and moisture evacuation could be accomplished by the familiar secondary vacuum already inherent in some of the foregoing assemblies. However, it would even be helpful if the operator were permitted to walk a few feet away from the damage site in employing this portability feature.

Moreover, it should be possible to remove the extruding parts from the assembly, reload them with additional resin (802) and replace them, all without unduly flexing the transparent substrate (801) by resetting the assembly's seal against it (801), thereby enhancing repair upon damage regardless of its size—upon a crack traversing the breadth of an automobile windshield, for example.

It would also be desirable to provide a way to repair the curved sector of a windshield itself by stationing the extrusion assembly directly over it rather than merely a way to support the assembly upon the curvature for repair near it.

Where vertical substrates (801) are concerned—such as a plate glass window or uprightly disposed windshield—the repair device should be designed without cumbersome plumbing to compensate for the counter productiveness of gravity otherwise helpful in getting the resin (802) into a site and permitting the effluence therefrom of lighter residual air and moisture.

The assembly should also comprise means to avoid damaging the transparent substrate (801) because of overadvancement of the mechanism.

Better speed and efficiency in accomplishing the repair have obviously also been long sought after results.

The needs and objectives pointed out supra thus far remain only partly addressed in the prior art. Some, such as those just immediately addressed, have not been met at all.

SUMMARY OF THE INVENTION

The invention is a repair assembly for a windshield, window or other like transparent substrate (801).

A four-part (1, 2, 3, 5) extrusion assembly (10) injects resin (802) into the substrate's (801) damaged site. All of the parts—an extruding rod (1), an extrusion tube (2), a vacuum container (3) and a compression grommet (5)—fit together concentrically along their (1, 2, 3) axes of longitudinal extension. The first three (1, 2, 3) are elongated in configuration.

This assembly (10) is mounted for repair to extend through a planarly configured apparatus platform (6), in turn supported by a number of suction cup assemblies (7) extending from the substrate (801).

Connecting to the extrusion assembly (10) to draw a vacuum employed in the invention's use is a vacuum producing assembly (410) of any sort known to prior art. However, this assembly's (410) connecting member—an attaching conduit (411)—comprises an additional part of the invention. It (411) penetrates the vacuum container (3) to provide a primary vacuum chamber (31) therein (3) and an open passageway between the assembly (410) of which it (411) is part of and the underlying damage site. An extrusion tube vacuum accommodating step (89) may also be included to widen the chamber (31).

The extruding rod (1), the innermost of the concentrically disposed elongated members (1, 2, 3) of the extruding assembly (10), is capable of creating what is designated herein as a secondary vacuum. In doing so, the extrusion tube (2)—the intermediate elongated member of the three (1, 2, 3)—is screwed down against the compression grommet (5) which seals the extrusion assembly (10) against the substrate (801), thereby isolating the primary vacuum chamber (31) from a secondary vacuum chamber (21) within. Withdrawal of the extruding rod (1) within the extruding tunnel (22) it (1) is disposed within (22) raises the upper limit of the secondary vacuum chamber (21) and consequently strengthens the vacuum within it (22). A draft ledge (202) is preferably disposed within the tube (2) to enhance removal of residual air and moisture from the damage site.

Ring seals (14, 24), preferably seated within recesses (18, 28) of vertically oval configuration, are disposed at strategic sites within the extrusion assembly (10) to permit the vacuum's creation and retention.

The apparatus platform (6) is preferably divided to provide a subplatform (61) which can be pivoted downward to follow the curvature of a windshield. Openings (621, 622) disposed within both accommodate mounting the extrusion assembly (10) upon either (6, 61).

Features are present to prevent risk of damage which might otherwise occur by reason of over-advancement of the various members. Thus, the extruding rod (1) and extrusion tube (2) each comprise a stop shoulder (19, 29, respectively) designed and disposed to abut corresponding stops (91, 92). Radial stop features are also included which prevent the vacuum container (3) from over-advancement wherein the underlying substrate might be damaged. Thus, the vacuum attachment conduit (411), upon rotation so as to advance the container (3) through the platform (6) or subplatform (61), is disposed to collide in abutment either with one of the lock-down nut protrusions—promontories (642) as they are herein designated—or with a radial interference knob (65), which, incidentally, doubles as a connection site for a suction cup assembly (7).

In operation, the assembly permits locking off the primary vacuum. This makes possible a number of approaches or manipulations that may be performed. For example, the extrusion assembly (10) may be loaded with resin (802) without having any part of the mechanism touch the glass but with the vacuum continuing to exist throughout the operation; or, with the assembly (10) in place against the substrate (801), the extruding rod (1) may be partially withdrawn within the extrusion tube (3) to strengthen a secondary vacuum disposed there; or, the rod (1) may be employed as a hydraulic ram to force additional resin (802) directly into the damage site without concern for its (802) lateral escape by leakage into the vacuum container (3).

BRIEF DESCRIPTION OF THE DRAWINGS

Solid lines in the drawings represent the invention. Dashed lines represent either non-inventive material, that not incorporated into an inventive combination hereof and which may be the subject of another invention, or that which although so incorporated, lies beyond the focus of attention.

FIGS. 2–5 comprise cross sectional cut-away views of the resin extrusion assembly (10). In both FIGS. 2 and 3, the extrusion tube (2) is fully withdrawn. In FIG. 2, the extruding rod (1) is also withdrawn, while in FIG. 3, it (1) is fully advanced. In FIGS. 4 and 5, the extrusion tube (2) is fully advanced, while the extruding rod (1) is first shown withdrawn and then advanced, respectively.

FIGS 11 and 12 feature the compression grommet (5) in perspective and side view, respectively. The thickened and thinned sectors (51, 52, respectively) can be observed in the latter of the views.

FIG. 13 represents a radial interference knob (65) in perspective and FIG 14, platform stabilizing pin (63) from the side.

FIG. 15 illustrates the effect of the extrusion tube's draft ledge (202) upon residual air and moisture extracted from the resin (802), drawing it upwards into the secondary vacuum chamber (21).

DESCRIPTION OF THE PREFERRED EMBODIMENT

Figure 1:
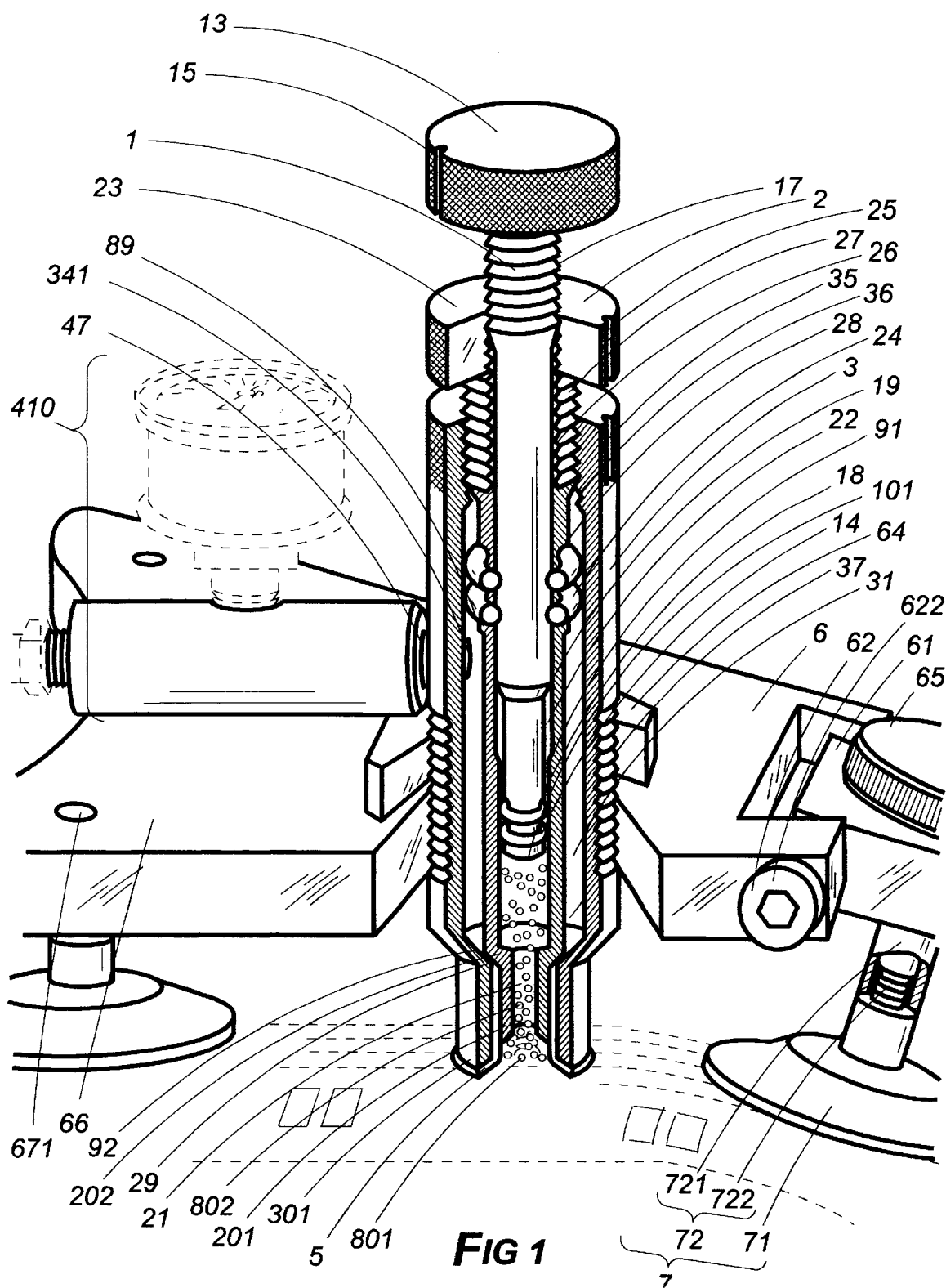
FIG. 1 represents in perspective a partially cut-away view of the assembly mounted for repair—the damaged transparent substrate (801) comprising a windshield—showing the curve following subplatform (61) in a downward inclined pivoted disposition so as to conform to the shape of the underlying windshield. In this depiction, the extrusion tube (2) is fully advanced, the extruding rod (1) fully withdrawn. This embodiment illustrates curved styling to part of the apparatus platform (6).
Figure 6:
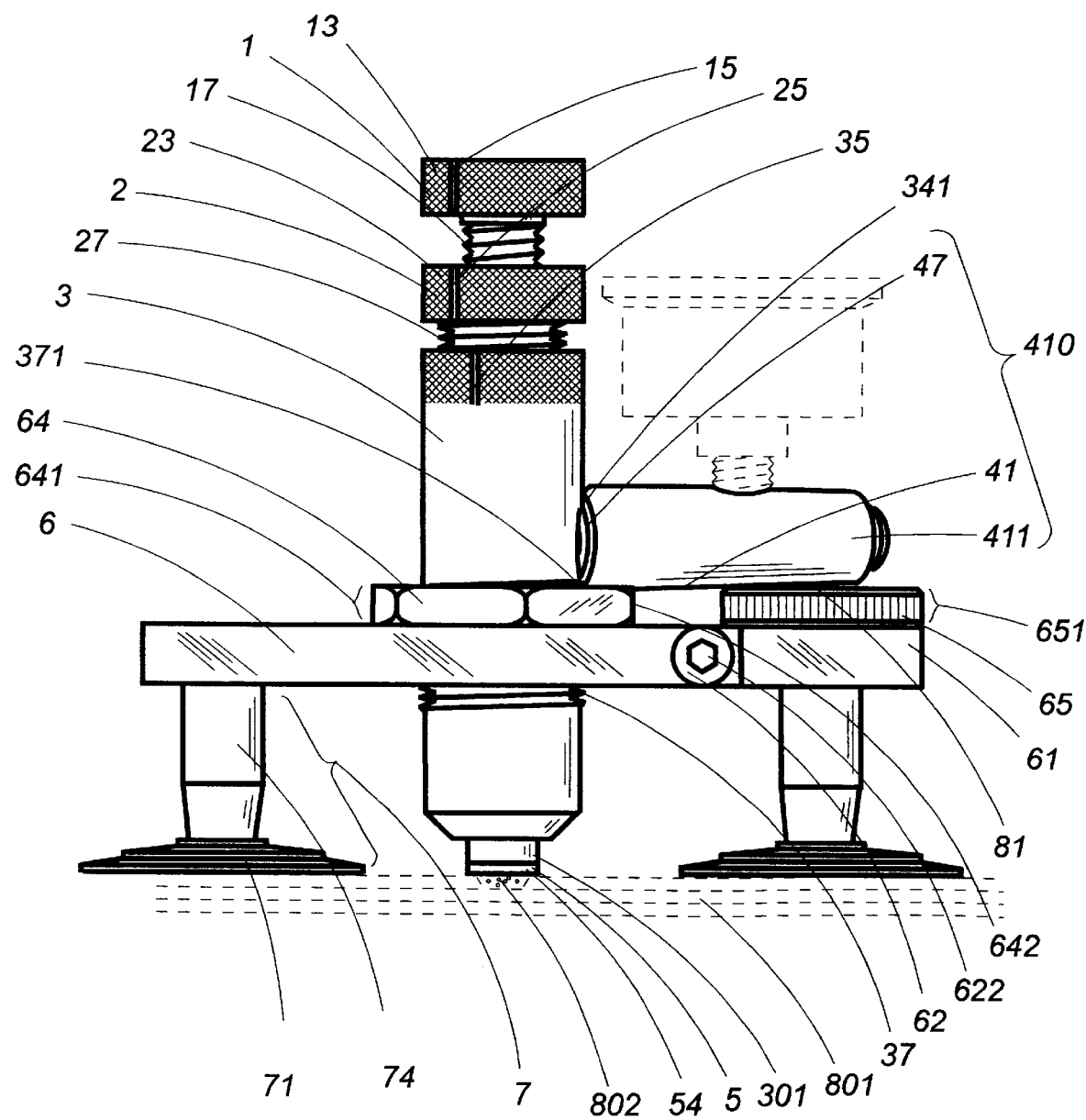
FIG. 6 illustrates a side view of the assembly mounted upon a planar—or non-curved—portion of a windshield. The radial interference knob (65) is disposed upon the curve following subplatform (61) and is engaged by a suction cup assembly (7) to provide support thereat. The degree of advance and withdrawal of vacuum container (3) and lock-down nut (64) relative to the subplatform (61) is such as to permit the vacuum attachment conduit (411)—an object not only providing a portion of the passageway between the remainder of the vacuum producing assembly (410) it (411) is part of but one doubling as a special type of radial interference projection (41), ante—to abut the radial interference knob (65), thereby effecting a distal interference stop (81), ante. Both the extruding rod (1) and extrusion tube (2) are fully advanced.

The subject of this application is a repair assembly for what is designated herein as cracked or chipped transparent substrate (801) an automobile windshield, window, mirror, in general, any glass structure or other like objects such as sheets of plastic or plastic mirror. By reason of the economies at stake, the invention would most likely be employed upon such substrate (801) as an automobile windshield, plate glass window or other expensive-to-replace item.

The assembly which is the subject hereof successfully addresses all of the sought after objectives, supra.

The resin extrusion assembly (10) comprises, as a family of its most essential pieces of hardware, an extruding rod (1), extrusion tube (2) vacuum container (3) and compression grommet (5). All but the last thereof (5) comprise what is described herein as longitudinal extension—that is, they are generally elongated structures.

The extruding rod (1 is fitted within the extrusion tube (2) in a lengthwise manner and it is accordingly stated herein that the longitudinal extension of the rod (1) is concentrically disposed within the tube (2). The latter (2) is fitted within the vacuum container (3) also in a lengthwise manner and it is, therefore, similarly stated herein that the longitudinal extension of the extrusion tube (2) is concentrically disposed within the vacuum container (3). As sometimes expressed in common parlance, the three parts (1, 2, 3) are said to essentially "telescope" together.

The extruding rod (1) is configured to comprise an externally threaded sector (17) and the extrusion tube (2), an internally threaded sector (26). The two sectors (17, 26) interthread—that is, their (17, 26) threads are mated and are, therefore, said to be disposed to coengage. Because the connection, although one merely effected by interthreading, is firm, it is appropriately designated herein as one of rigid emplacement.

Similarly, the extrusion tube (2) comprises an externally threaded sector (27) and the vacuum container (3), an internally threaded sector (36) disposed to coengage in rigid emplacement in the same manner.

The extruding rod (1) and the extrusion tube (2) each comprise a turning knob (13, 23, respectively) by which their externally threaded sectors (17, 27) may be advanced within the internally threaded sectors (26, 36) they (17, 27) are respectively disposed within. Preferably, the knobs (13, 23) comprise knurled surfaces to facilitate turning. Consistently, a portion of the vacuum container (3) may also be configured with knurling such that it (3) may be gripped more securely by the operator while operating the tube's turning knob (25) or connecting the container (3) to a supporting apparatus platform (6), ante.

It is preferable also that each knob (13, 23) as well as the vacuum container (3) comprise a turning reference mark (15, 25, 35, respectively). It should be recognized that in certain mechanical assemblies, threaded structures comprise more than merely a means of connection. By reason of their inherent configuration, they comprise a property by which the distance between threads determines upon one complete rotation the distance the structure is advanced or withdrawn. In instances in which it is important to observe or control the degree of such displacement, a turning reference mark (15, 25, 35) is useful. For example, if the external threads of the extrusion tube (2) are ¹⁄₁₆ inch apart, one complete rotation of the turning knob (23) advances the tube (2) within the vacuum container (3) exactly ¹⁄₁₆ inch—an interval experience has shown to be sufficiently small to be workable in a desired fine tuning sense.

In operation, the vacuum container (3)—the most exterior of the three joined components (1, 2, 3)—is that brought most proximate the transparent substrate (801). It (3) together with the remaining interconnected elongated components (1, 2) of the resin extrusion assembly (10)—is supported by the apparatus platform (6) mentioned supra, which comprises a vacuum container threaded opening (620) passing through it (6). The vacuum container (3) connects to the platform (6) by insertion through its upper face (66) into the opening (620). The opening (620) is configured such that its (620) threads coengage those of the container's externally threaded sector (37)—or as otherwise expressed herein, such that the container (3) or any other object comprising an identically configured threaded sector may be disposed through it (620) by interthreading. This disposition of the container (3) invokes the importance of the precise turning features discussed supra.

One of the ways in which the turning features are employed relates to vacuum control. In addressing the vacuum provision concerns, supra, it is important to dispose the extrusion tube (2) such that there is an open passageway between any vacuum producing assembly (410) employed and the vacuum container's applicating end (301). In considering a different but related objective, supra, of providing the capability of locking in a vacuum provided during the early steps of operation such that the vacuum producing assembly (410) might, at least temporarily, be conveniently isolated from the extrusion assembly (10) and the liquified resin (802) allowed to follow a more confined route to the repair site with the vacuum still in place, the extrusion tube (2) must be advanced to engage a vacuum sealing agent. In the assembly which is the subject hereof, the compression grommet (5) serves as that agent. During those times the vacuum passageway must at least temporarily be kept open, it is essential that the extrusion tube (2) be withdrawn to break contact with the grommet (5). If the tube's (2) withdrawal is held to a minimum, the grommet (5) can thereafter be re-engaged to lock in the vacuum without inordinate loss of time. To that end, the tube (2) can be retracted a distance consistent with only a predetermined number of rotations of its turning knob (23). The tube and container turning reference marks (25, 35, respectively) are of considerable benefit in that regard.

A second way in which the turning features are used to advantage concerns the disposition of tube ring seals (24) when fitting the respective components (2, 3) together, further discussed ante.

Yet another way the turning features are important involves successful creation of a vacuum in a secondary vacuum chamber (21) proximate the tube's applicating end (201). In operation, the extruding rod (1) is advanced and withdrawn up and down an extruding tunnel (22) disposed within the extrusion tube (2). The secondary vacuum chamber (21) is the portion of the tunnel (22) proximate the rod's applicating end (201). Once a vacuum has been locked in by the tube's (2) abutment with the compression grommet (5)—thereby isolating the vacuum within the secondary vacuum chamber (21) from that disposed within the primary vacuum chamber (31)—the extruding rod (1) is withdrawn within the extruding tunnel (22) to enlarge the secondary vacuum chamber (21) and strengthen the secondary vacuum. The greater the distance withdrawn, the stronger the vacuum. Because experience generally dictates the strength of the vacuum desired at this stage of operation, alignment of the turning reference marks (15, 25) of the rod and tube (1, 2) can be advantageously observed and controlled.

The vacuum producing assembly (410) briefly alluded to supra comprises the apparatus which provides the vacuum employed by the invention. The assembly (4) may be generally of any sort known to prior art. It (4) is attached to the vacuum container (3) in a manner which permits the air to be drawn from the container (3). The attaching portion of the passageway in the assembly (410) through which this occurs is designated herein as a vacuum attachment conduit (411). It (411) is stated herein to be disposed by attachment to penetrate the container (3). The container (3) must, therefore, be configured with a vacuum producing assembly attachment opening (341) disposed at any convenient site thereon (3) which does not, of course, interfere with the interthreading of the extrusion tube (2) and the vacuum container (3). While attachment may be accomplished by any means known to the art, it is convenient in manufacture to configure the attachment conduit (411) with an externally threaded sector (47) and provide the vacuum container (3) with internal threads for the attachment opening (341) such that the two may interthread. An adhesive applied within the joint assures acceptable attachment. The remainder of the vacuum producing assembly (410) may be disconnected from the resin extrusion assembly (10) at a point distal the attachment site. Preferably, for reasons further considered ante, the disposition of the penetrating attachment of the vacuum attachment conduit (411) is transverse the longitudinal extension of the vacuum container (3).

The compression grommet (5) comprises durability sufficient to assure the resin's (802) delivery to the repair site but must, nonetheless, be flexible enough to give way and behave in safety valve fashion to accommodate any excessive hydraulic pressure the resin (802) might be subjected to. It (5) is configured approximately as a stubby tube but additionally comprises a circumferential flange so as to lend it a somewhat hat-shaped appearance, as illustrated in FIGS. 11 and 12. It (5) is open at both ends so as to permit the vacuum to be drawn and the resin (802) extruded through it (5). It (5) comprises a first end (53) configured merely tubularly or pipe-like such that it (53) may be axially disposed by emplacement for a reasonably snug fit within the container's applicating end (301) and a second end (54) which comprises the hat brim-like flange which fits snugly around and enwraps its (301) tip—characterized herein as cushioning enwrapment—such that the grommet (5) intervenes between its applicating end (301) and the transparent substrate (801).

It is preferable that the first, or tubular, end (53) be configured so that when abutted by the extrusion tube's applicating end (201), the grommet (5) is pushed slightly downward from its (5) seating site. Because of its (5) firm disposition against the substrate (801), its second end (54) is not permitted to protrude from the extrusion assembly's (10) end. Rather, the grommet (5) is thereby further compressed against the substrate (801), enhancing the seal. This configuration is evident in FIGS. 1–6.

It is preferable that the second, or enwrapping, end of the grommet (5) comprise a thickened sector (51) and a thinned sector (52) as shown in FIG. 12. The former (51) is preferably disposed centrally and the latter (52), peripherally. Upon undergoing compression, the thickened sector (51) becomes squeezed, transferring a portion of the pressured mass toward the thinned sector (52), thereby effecting a tighter seal than otherwise.

Ring seals (14, 24), comprised of an elastic but firm composition, are present to permit the vacuum to be produced and retained. They (14, 24) are stated herein to be axially disposed at their respective sites-each extruding rod seal (14) upon the extruding rod (1) and each extrusion tube seal (24) upon the extrusion tube (2).

At times the extrusion tube (2) is advanced to abut the compression grommet (5) so as to isolate the interior of the tube (2) from the vacuum producing assembly (410) and the extruding rod (1) withdrawn, the extruding rod ring seals (14) permit the creation of the vacuum in the secondary vacuum chamber (21), as briefly alluded to supra. The vacuum therein (21) is designated a secondary one to distinguish it from the presently isolated primary vacuum created by the vacuum producing assembly (410) and disposed within the primary vacuum chamber (31), in turn disposed in large part within the vacuum container (3). Each extruding rod ring seal (14) is disposed at a point upwards from the rod's applicating end (201). If there is but a singular one (14), it (14) defines the upper limit—or top—of the chamber (21). Where a pair of seals (14) is present, as preferred, the lower thereof (14) defines that boundary. Preferably, that upper limit should be as near the rod's applicating end (201) as is feasible. This would facilitate multiplying the size of the secondary vacuum chamber (21) upon the rod's (1) withdrawal so as to enhance the vacuum producing effect. It is easier, for example to double the initial size of the secondary chamber (21) if it is small than if it were large.

It is preferable to comprise the extrusion tube (2) with a draft ledge (202) which, upon creation of the secondary vacuum, is configured to form a duct-like avenue to permit the venting of unwanted air and moisture from the site. Although the extrusion tube (2) is fully advanced during production of the secondary vacuum so as to isolate its (2) interior from anything outside of it (2), the effluence, having been drawn from the resin (802), must be provided some place to go so as to keep the resin (802) purified. The tube's applicating end (201) may, therefore, be configured with an opening facilitating the passage of a draught, or draft. Just inside the end (201), the interior wall is disposed sharply away to the sides. Ordinarily, one would expect the interior wall to slope in funnel fashion toward the applicating end (201), extending downward at an obtuse—or broadly set—angle. The present feature, however, provides a more acutely carved corner comprising as little as a right angle or, perhaps, even a lesser one than that. The localized configuration is designated herein as a draft ledge (202). An embodiment comprising it (202) is shown in FIGS. 1–5, in which the corner's open angle slightly exceeds 90 degrees. By reason of the lower density air—whether or not it is moisture laden—comprises in contrast to that of the resin (802), the effluence together with some of the resin (802) tends to flow or be drawn upward into the forming secondary vacuum. With a vertically disposed instrument addressing repair on a horizontal surface, the effluence rises away from the resin (802). Not all of the credit is due to the force of gravity, however. The ledge (802) forms a draught for the effluence, permitting it to be drawn or sucked out of the way by the suddenly presented openness of the tube's (2) enclosure. The phenomena is recognized as the Bernoulli principle, or variously, the Venturitu be, effect. Helpful as the draft ledge (202) is in general, it is particularly beneficial in performing repairs upon a vertical surface during which gravity is likely to be more of a hindrance than a help in assuring that the resin (802) gets to its (802) intended site and removing the effluence from its (802) presence. This is so because in vertical repairs—such as those upon a plate glass window, or even to considerable extent upon an angularly upright disposed windshield—it is necessary to dispose a repair assembly for operation in a generally horizontal attitude.

It is also preferable to comprise the extrusion tube (2) with a vacuum accommodating step (89)—a shoulder-like inset or narrowing configured to widen the primary vacuum chamber (31).

The site at which an extrusion tube ring seal (24) is disposed is more critical than that of an extruding rod seal (14). In order to accomplish its intended purpose, a tube seal (24) must be disposed at a point above the vacuum container's vacuum producing assembly opening (341). Otherwise, a primary vacuum could not be produced proximate the extrusion tube and vacuum container applicating ends (201, 301). As with the extruding rod (1), the extrusion tube may comprise more than one ring seal (24) and the lowest disposed of them (24) within the vacuum container defines the upper limit of the primary vacuum chamber (31), the site wherein the primary vacuum is disposed.

To keep the ring seals (14, 24) from sliding out of place at their respective sites, obstructions of some sort may be disposed proximate them (14, 24). Preferably, grooves are carved at their (14, 24) sites so as to better retain them (14, 24) in place. In embodiments in which the grooves are present, the invention is, therefore, stated herein to comprise extruding rod seal axially disposed recesses (18) equal in number to that of the ring seals (14) and similarly, extrusion tube recesses (28), the number of which (28) is determined in the same fashion. When present, it is preferable that the recesses be configured vertically oval rather than perfectly rounded. The oval shape, properly disposed, compresses the seal (14, 24) against the wall of the particular structure it is disposed within to enhance the sealing function.

Because the resin (802) is applied at the extrusion tube's applicating end (201) in the manner of injection—that is, in a relatively thin finite stream rather than as an uncontrolled glob—the diameter of the extrusion tube (2) diminishes at that locus. While is is preferable that the tube's (2) tip comprise nozzle-like configuration, part of the structure (2) slant's inward toward its (2) axis, thereby providing a partial enclosure at the end (201). Upon advancing the extruding rod (1), it would ordinarily be expected that its applicating end (101) could be driven against this tapered part of the structure (2), perchance to damage it (2). It is, therefore, preferable to provide the rod (1) a stop shoulder (19) and the tube (2), an extruding rod stop (91), each disposed for coengagement such that the rod's shoulder (19) is stopped by the rod stop (91) at a point of advance such that the rod's applicating end (101) never quite reaches that (201) of the tube (2).

In similar manner, the extrusion tube also comprises a stop shoulder (29) and the vacuum container (3), an extrusion tube stop (92). In this instance, however, the configuration of the applicating ends of each (201, 301) provide these features themselves (201, 301). The vacuum container (3) comprises tapered configuration at its applicating end (301) in the manner of that of the extrusion tube (2). The extrusion tube (2) is, thus, permitted to advance to the vacuum container's applicating end (301) until it (2) abuts that structure's (3) inwardly tapered wall. Even where the tube (2) comprises a nozzle at its applicating end (201) as mentioned, no part thereof (2) is permitted to advance to a point where it (2) might damage the transparent substrate (801).

There is always to consider, of course, the potential danger of damaging the substrate (801) by reason of over-advancement of the vacuum container (3). As the container (3) is rotated in advancement or withdrawal through the apparatus platform (6) or subplatform (61) optionally part of it (6), the vacuum attachment conduit (411)—attached to the container (3) as it is—necessarily rotates with it (3). It is often convenient to manipulate the conduit itself (411) in accomplishing the rotations. When the lock-down nut (64) is in place, whether tightened down or not, a radial interference projection (41) is disposed such that it (41) will abut one of the nut's promontories (642) during the vacuum container's (3) advancement. The two structures (41, 642) coengage at a proximal interference stop (82). If the nut (64) is not yet tightened down, the projection (41) will drive it (64) against the platform's upper face (66), tightening it (64). The lock-down nut (64) is manufactured to comprise thickness (641) such that when this radial stopping state is attained, the vacuum container's applicating end (301) does not quite reach the transparent substrate (801). The top of the vacuum container's externally threaded sector (37)—that is, the upper thread limit (371)—should, of course, be disposed at a height sufficient to permit the container's applicating end (301) to descend to a point proximate but not contacting the substrate (801). As a matter of convenience in manufacture, it is preferable that the vacuum attachment conduit (411), supra, comprise the radial interference projection (41). In the embodiment shown in FIGS. 1, 6, 7, 9 and 10, the bottom edge of the conduit (411) is the portion thereof (411) which makes the interfering contact. It is for this reason it is preferred that the vacuum attaching conduit's (411) penetrating attachment be transverse the vacuum container (3) rather than, for instance, in a longitudinally disposed manner at either of its (3) ends. Transverse connection permits the conduit (411) to be disposed so as to provide the sought after radial interference.

The invention also comprises a radial interference knob (65). The knob (65) comprises an externally threaded sector (657) identically configured to that (37) of the vacuum container (3). By reason of the matching threads, the knob (65) and the vacuum container (3) can be interthreaded interchangeably into the vacuum container threaded openings (620, 621) of either the apparatus platform (6) or the subplatform (61) of which (6) it (61) is part. Like the lock-down nut (64), the radial interference knob (65) also comprises thickness (651) providing a radial stop. Thus, even in the absence of the lock-down nut (64)—by operator oversight, for example—so long as the subplatform (61) is not in tilted disposition, the radial interference projection will abut the knob (65) in rotation, preventing the vacuum container's (3) further descent. The point at which the two structures (41, 65) coengage is herein designated a distal interference stop (81). As with the lock-down nut (64), supra, the vacuum container's applicating end (301) does not extend to the transparent substrate (801). It should be remembered, however, that if substrate (801) damage is to be avoided by reason of the radial stopping feature, the lock-down nut (64) must be in place if the subplatform (61) is tilted downward. FIGS. 6, 7, 9, and 10 demonstrate these features.

The apparatus platform (6) and subplatform (61) it (6) are preferably supported by at least one suction cup assembly (7). Three of them (7) are preferred so as to lend the assembly tripod support. Each (7) comprises a suction cup (71) and suction cup connection means (72). Preferably, the means (72) comprises a stabilizing tubular spacer (721) and connecting bolt (722) and the platform (6), threaded suction cup bolt openings (671) at least equal in number to that of the connecting assemblies (7). It is also preferable that the suction cup connecting means (72) comprise a form of attachment rather than a less firm connection, since there is no compelling reason to remove those (72) connected to the platform (6) proper once the connection is made. An adhesive may, therefore, be applied to the connection joint. An embodiment so comprising those features is shown in FIGS. 1–7.

When the resin extrusion assembly (10) is disposed in either the platform vacuum container opening (620) or the subplatform vacuum container opening (621), the radial interference knob (65) may be disposed in the other of the two (620, 621). The knob (65) is configured to accommodate suction cup connecting means (72). In an embodiment in which the suction cup connecting means (72) comprises a connecting bolt (722) as mentioned supra, the knob (65) comprises a threaded suction cup bolt opening (665) through which connection may be made. By reason of the interchangeability features, this connection does not rise to one of attachment as with the case of the invention's other suction cup assemblies (7). The threads of the connecting bolt (722) coengage those of the knob (65) to provide acceptable support.

Figure 7:
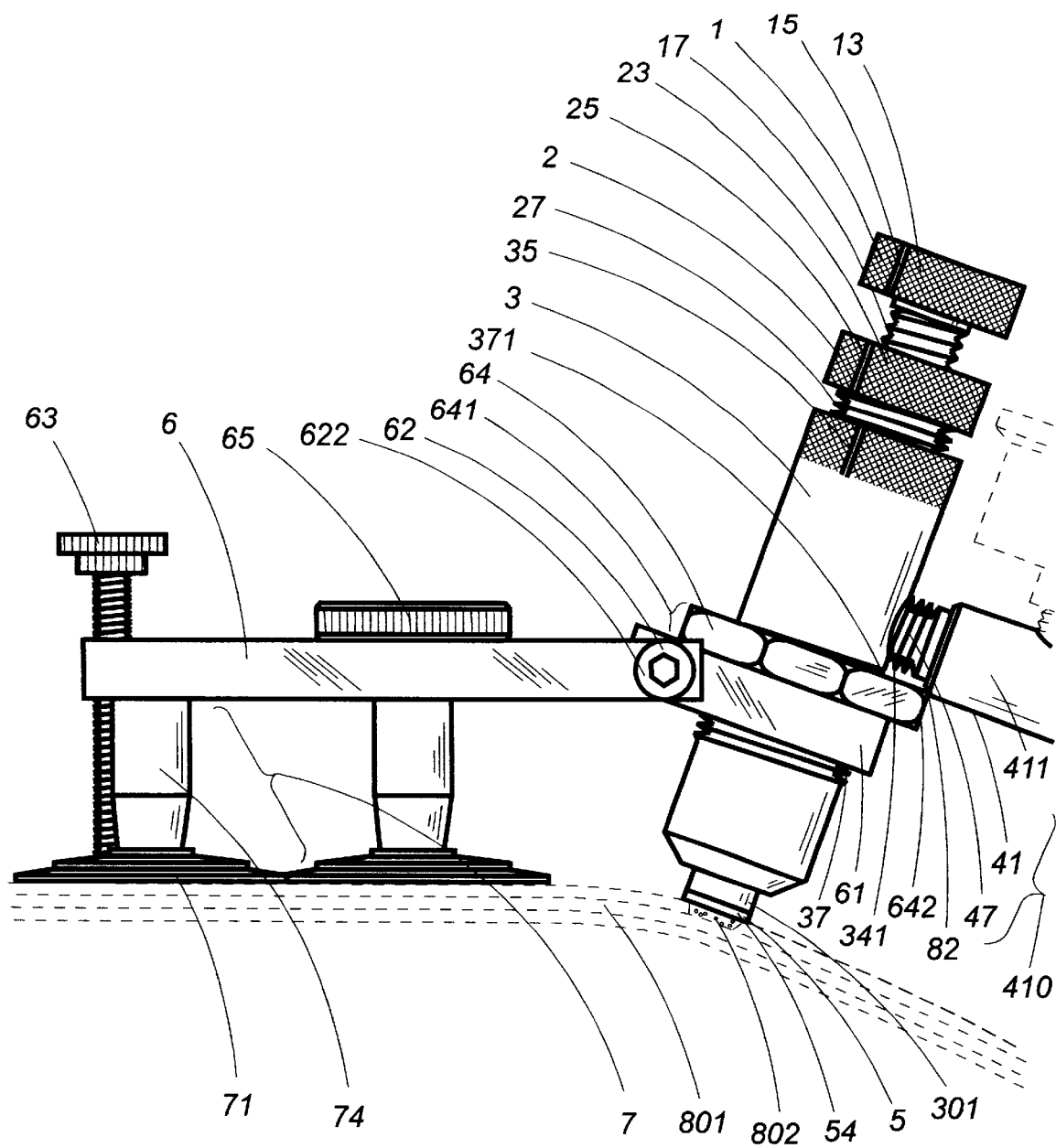
FIG. 7 depicts the assembly mounted such that the declination of the curve following subplatform (61) is downward for repair upon the curved portion of a windshield. The radial interference knob (65) has been relocated and the suction cup assembly (7) removed to allow for disposition of the resin extrusion assembly (10) through the subplatform (61). By reason of the interference knob's (65) relocation and the tilt of the subplatform (61) the vacuum attachment conduit (411) contacts the lock-down nut (64) only—at one of its promontories (642)—thereby effectuating a proximal interference stop (82). A platform stabilizing pin (63) is also present.
Figure 8:
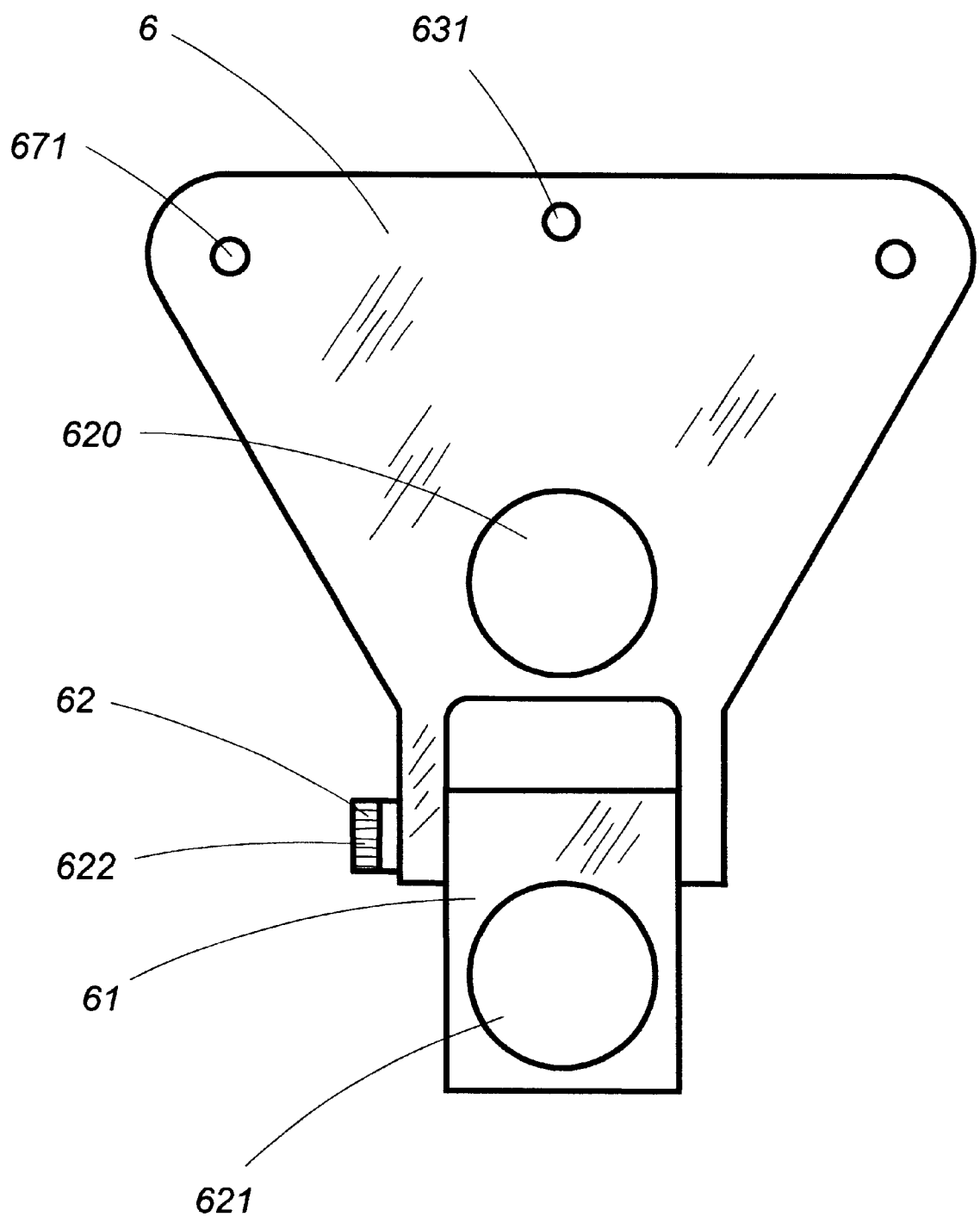
FIG. 8 represents the apparatus platform (6) from overhead, illustrating thereon, among other things, the various openings (620, 621, 631 and 731).
Figure 9:
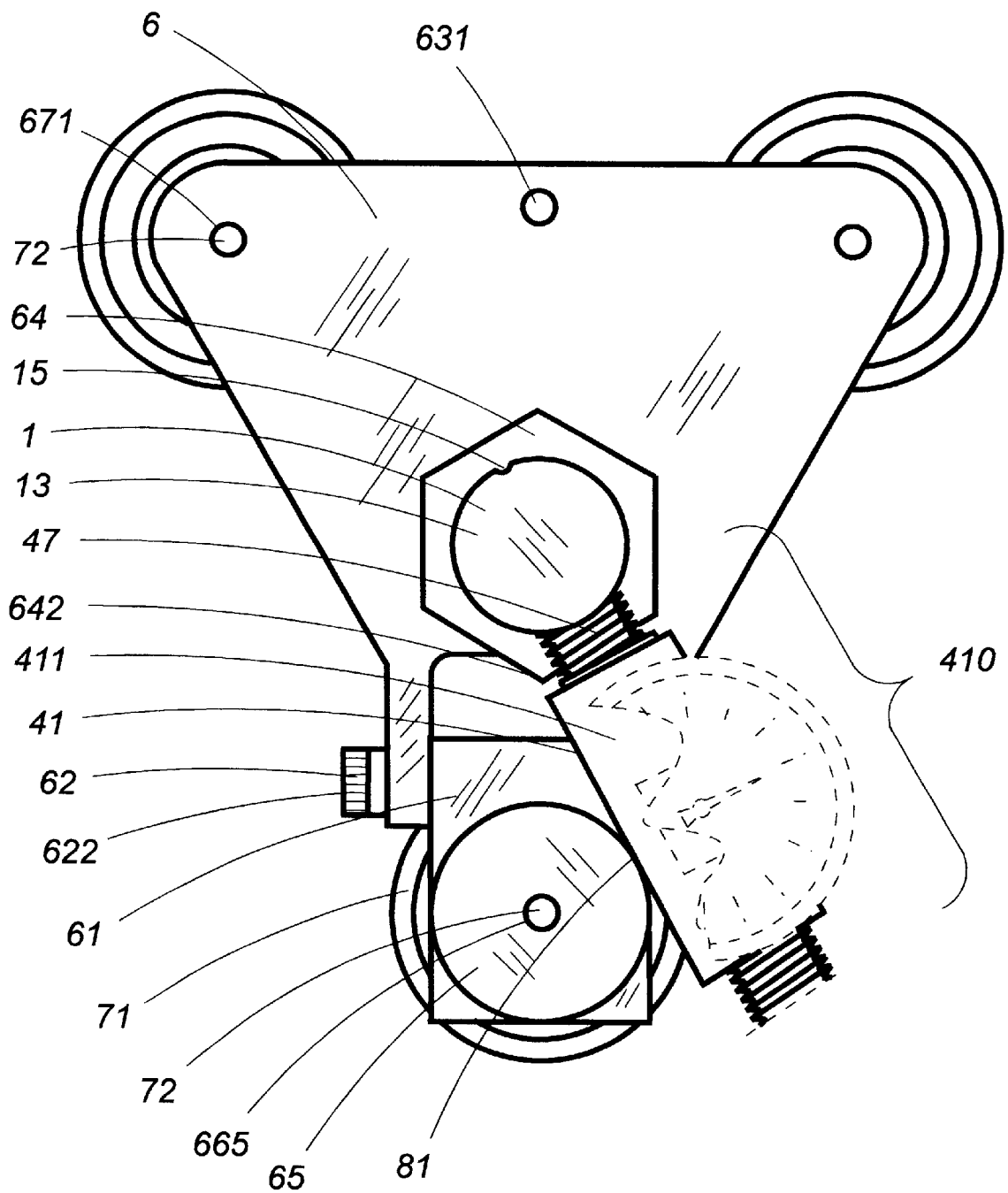
FIGS. 9 and 10 illustrate from overhead the interrelationship of the radial stopping features of the vacuum attachment conduit (411). In the former, stopping contact is made with the interference knob (65), providing the vacuum container (3) a distal interference stop (81). In the latter, stopping contact is made with the lock-down nut (64), providing a proximal interference stop (82).
Figure 10:
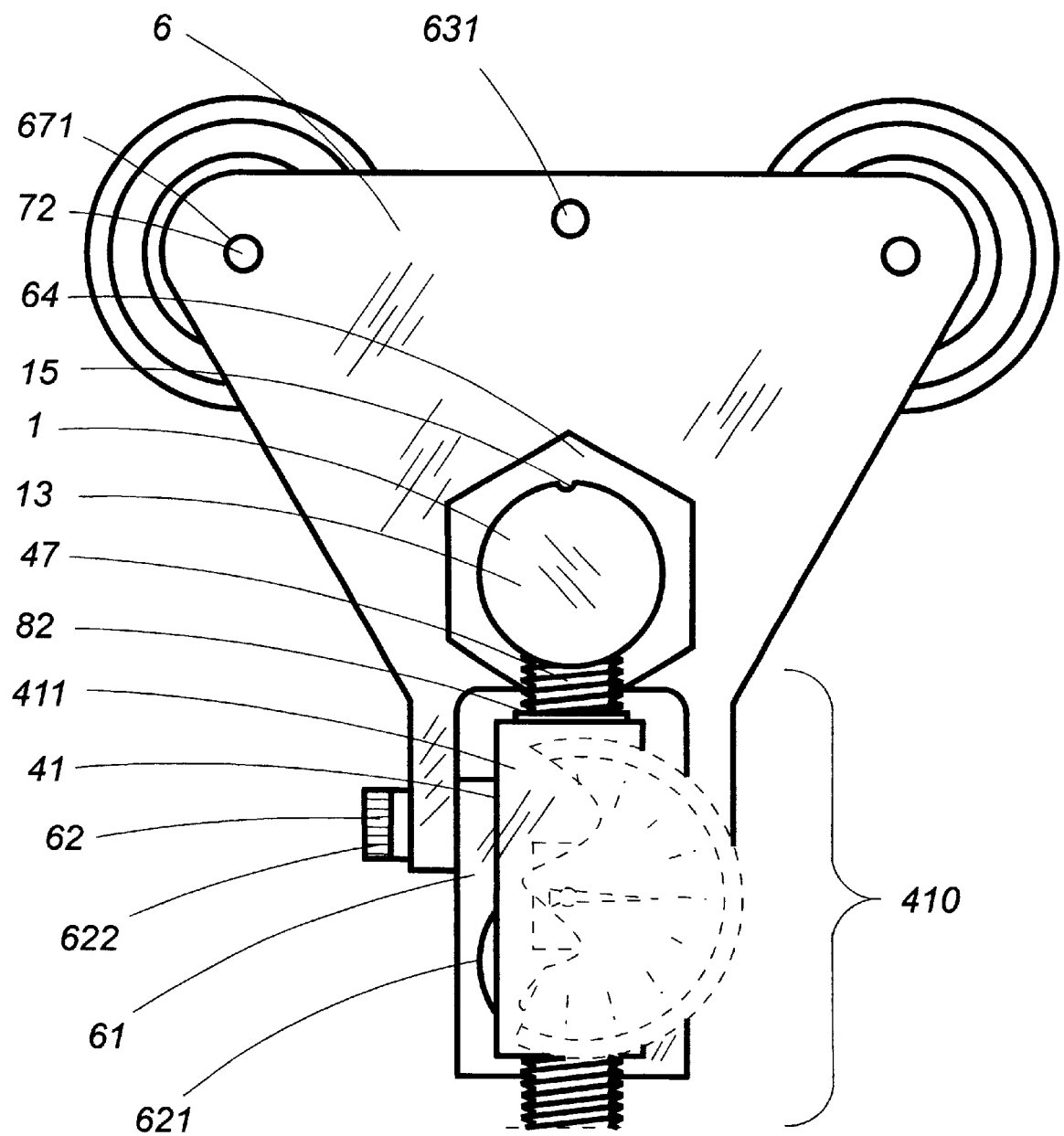

A portion of the apparatus platform (6) preferably is divided to comprise the curve following subplatform (61) alluded to supra. The subplatform (61) may be configured in a number of ways but a portion of it (61) should extend within the boundaries of the remainder of the platform (6) so as to permit pivoting means (62) therefrom. In a preferred embodiment, such means (62) comprises a hinge pin (622) of the sort known to prior art disposed in axle fashion to penetrate both the platform (6) proper at opposing points and the subplatform (61). The pin (622) is disposed such that it (622) rotates within the lateral, horizontal dimension of the platform (6) proper. Through that dimension within the subplatform (61), however, it (622) is connected by attachment such that the subplatform (62) may be rotated upon the horizontal axis upwards or downwards with reference to the remainder of the platform (6). While other hinge means (62) are feasible, the hinge pin (622) may be the most economical to produce. It is also preferable that the hinge means (62) comprise convenient means of tightening to set declination at a selected angle. A hexagonal socket opening disposed within the exterior end of the pin (622) may be adjusted by a simple tool, such as an Allen® wrench. FIG. 1 shows the subplatform (62) disposed at an angle of declination such that a suction cup assembly (7) supporting it is suitably disposed upon the transparent substrate's (801) curvature. FIG. 7, on the other hand, illustrates disposition of the resin extrusion assembly (10) through the subplatform (61) similarly set at an angle of declination which permits repair upon a curved sector of the substrate (801).

Experience dictates that when the extrusion assembly (10) is disposed through the subplatform (61)—particularly when pivoted downward—as just mentioned supra, better results are attained if additional force is brought to bear upon the repair assembly against the substrate (801). To that end, the invention hereof preferably comprises further a platform stabilizing pin (63). The disposition of this pin (63) is distal and in lateral opposition to that of the extrusion assembly (10). The pin (63) comprises threaded configuration and coengages threads of a stabilization pin opening (631) in the platform's upper face (66). The pin (63) comprises sufficient length so that upon continuing to screw it (63) through the opening (631), it's (63) tip is permitted to extend to the underlying substrate (801). Further interthreading retracts the associated portion of the apparatus platform (6) upward and, consequently, forces he platform's (6) opposing end downward against the repair site. If the pin (63) comprises plastic composition, no damage to the substrate (801) is likely to occur. However, if composition is metallic, it is preferable to provide it (63) with a soft tip sheath (634). The sheath (634), when present, must be configured to allow the threads of the pin (63) to coengage those of the opening (631) and, consistently, the diameter of the sheathed pin (634) must not exceed by much the inner diameter of the opening (631). It is, therefore, feasible to narrow the metallic shank of a metal pin (63) at the sheath's (634) seating site as shown in FIG. 13. As with the other interthreaded parts of the invention, the connection is stated to comprise one of rigid emplacement.

To undertake repair to a windshield—a fitting typical example of its use—the extrusion tube and vacuum container combination (2, 3) is screwed down into place through a vacuum container opening (631) in the apparatus platform (6), positioned so that the vacuum container (3) is stationed above the damage site, and the underlying vacuum cups (71) are pressed down upon the windshield tightly to effect a reliable connection. The vacuum producing assembly (410) is also connected to the vacuum attachment conduit (411). The container (3) is advanced until the compression grommet (5) is sealed tightly against the windshield.

Should the operator, having concern either for portability or avoidance of undue windshield flexing, wish to invoke the alternative alluded to supra, he or she might do so by removing all three longitudinally concentric parts (1, 2, 3), fully advancing the extrusion tube (3), either loading the resin (802) within the tube (3) and drawing the primary vacuum or vacuuming first and loading second—tying off the airway from the vacuum pump with a pinch clamp and then carrying the vacuum to the site to undertake the other steps outlined herein. FIG. 2 illustrates the disposition of the parts which permit this approach.

In any event, having reached this stage, one must consider the character of the damage. If it is small enough to be encompassed by the grommet (5), the vacuum and injection process is fairly straightforward. Resin (802) loading is invariably better accomplished through the assembly's tube and container applicating ends (201, 301) rather than through its (10) top. If resin (802) is loaded from the top, it will likely fill the interior of the compression grommet (5), blocking the primary vacuum path. Either a syringe or a commercially available squeeze bottle and tube are the most suitable mechanisms of delivery. Because of the tiny dimensions of the opening and the very small quantities of resin (802) typically applied, for that matter, appropriate care should be taken during this loading operation to assure that resin (802) which might otherwise adhere to the grommet (5) be kept remote from it (5). Loading should, therefore, be done only when the extrusion tube (2) is separated from the container (3), whether the entire assembly (10) has been removed from the supporting apparatus platform (6) or the rod (1) and tube (2) combination only have been removed from the container (3) remaining there (6). Once the extrusion assembly (10) is in place against the substrate (801) with the extruding rod (1) screwed into the extrusion tube (2)

in turn advanced substantially within the extruding tunnel (22), the locked-out vacuum may be extended to incorporate the cavity within the tunnel (22) beneath the rod (1)—the secondary vacuum chamber (21). The extrusion tube (2) is accordingly withdrawn sufficiently for this purpose. It is helpful to observe the container's and tube's turning reference marks (25, 35), if present, in setting the degree of the tube's (2) withdrawal. Although at prior art, resin (802) was occasionally loaded in another convenient manner, by dipping an assembly into a resin (802) supply and drawing some of it (802) into itself in the manner of a fountain pen, currently existing commercial resin (802) supply squeeze bottles are too small to permit the tube's (2) intrusion into them. Should bottled supplies with larger openings for dipping appear, that loading method, too, would be feasible. In either case, because of the vacuum's draw and the assistance of gravity, the resin (802) easily enters the damage site. The rod (1) may then also be advanced to aid the resin's (802) flow by reason of its (1) ram, or hydraulic, effect against the resin (802). It is also helpful here to observe rod and tube reference marks (15, 25) in advancing the rod (1) the distance desired. Resin (802) may be reloaded, if necessary, either by re-injecting it (802) into the tube (2) as before or, if conveniently sized dipping containers become available and it is considered acceptable to lose the vacuum, by once again dipping the rod and cylinder combination (1, 2) into the resin (802) supply before returning the loaded combination (1, 2) to its (1, 2) place within the vacuum container (3).

If the damaged area exceeds that encompassed by the grommet (5)—whether comprising a large hole or a long crack—the taping or plastic template measures known to prior art discussed supra may be taken to effectually reduce the size of the application site to one which can be controlled.

Consistent with the objectives elicited supra, more must be done at this stage to enhance repairs since, as considered, residual air must yet be removed from the site. Therefore, with a vacuum in place, the tube (2) is advanced so that its applicating end (201) abuts the compression grommet (5), thereby sealing off the primary vacuum chamber (31). The partial withdrawal of the extruding rod (1) enlarges the secondary vacuum chamber (21) and strengthens the vacuum therein, drawing much of the residual air from the repair area. The rod (1) may then be once again advanced to employ the ram effect and the withdrawal—advancement manipulations repeated for as many times as considered necessary. Drilling into or pre-heating the damage site in the manner done at prior art may, of course, also be undertaken to facilitate the repair process.

If the damage is disposed near a curved sector of the windshield, the subplatform (61) may be pivoted to and set at an acceptable angle of declination so that a suction cup assembly (7) may support it (61) over the curvature. If the damage is disposed upon the curved sector itself, the extrusion assembly (10) may be mounted through the subplatform vacuum container threaded opening (621) with the subplatform (61) similarly set at the proper angle of declination. To assure that the assembly is held down with sufficient force, the platform stabilizing pin (63) may be installed and interthreaded so that its (63) tip abuts the underlying substrate (801). The radial interference knob (64), having been removed from the subplatform (61) to make way for the extrusion assembly (10), may now be connected within the platform vacuum container threaded opening (620) either for temporary stowage or to serve as platform (6) support by having a suction cup assembly (7) connected to it (63) with the suction cup connecting means (72) interthreaded into its bolt opening (665) as shown in FIG. 7

In all of this, of course, the turning reference marks (25, 35) are of considerable benefit since experience teaches the degree of withdrawal and advance most workable. Since the invention may comprise assembly size and thread separations of varying dimensions, the degree of advance and withdrawal accomplished with a single rotation of the turning knob will, of course, similarly vary from one embodiment of the invention to another.

Repair to a plate glass window may be accomplished much in the same manner as that employed for windshield repair. However, since the assembly is then vertically disposed, as alluded to supra, the pull of gravity can neither be as assuredly relied upon to assist resin (802) injection nor to maintain effluence separation. Nonetheless, the draught effects explained, supra, together with the other assisting factors of the vacuum and the rod's (1) ram effect may successfully be employed to successfully address the otherwise troublesome gravitational issue.

The foregoing steps lend themselves to an innovative methodology of the sort which might be outlined in a novel repair process.

The inventor hereby claims:

1. A transparent substrate repair assembly comprising a resin extrusion assembly in turn comprising
    an extruding rod;
    an extrusion tube;
    a vacuum container;
    a compression grommet; and
    a vacuum attachment conduit;
the repair assembly further comprising
    an apparatus platform comprising an upper face; and
    at least one suction cup assembly comprising a suction cup and connecting means disposed to support a portion of the apparatus platform; wherein
    the extruding rod, extrusion tube and vacuum container comprise longitudinal extension, that of the extruding rod concentrically disposed within the extrusion tube and that of the extrusion tube in turn so disposed within the vacuum container;
    the vacuum attachment conduit is disposed by attachment to penetrate the vacuum container; and
    the compression grommet is axially disposed with a first end thereof configured for emplacement within the vacuum container's applicating end and a second end for cushioning enwrapment upon it;
the extruding rod further comprising:
    a turning knob;
    an externally threaded sector; and
    one or more ring seals axially disposed to provide a secondary vacuum chamber within the extrusion tube;
the extrusion tube further comprising:
    a turning knob;
    an externally threaded sector;
    an internally threaded sector disposed for coengagement with the extruding rod's externally threaded sector;
    an extruding tunnel; and
    one or more ring seals axially disposed to provide a primary vacuum chamber within the vacuum container;
the vacuum container further comprising:
    a vacuum producing assembly attachment opening;
    an externally threaded sector; and
    an internally threaded sector disposed for coengagement with the extrusion tube's externally threaded sector; and
    the apparatus platform comprising at least one threaded opening configured such that the vacuum container or any other object comprising an identically configured threaded sector may be disposed therethrough by interthreading;

whereby the entire assembly may be disposed to repair the damaged substrate.

2. The transparent substrate repair assembly according to claim 1 wherein the extruding rod and the extrusion tube further comprise axially disposed seal recesses equal in number to that of the ring seals disposed upon each, thereby providing each seal a respective seating site.

3. The transparent substrate repair assembly according to claim 1 wherein the extruding rod further comprises a stop shoulder and the extrusion tube further comprises an extruding rod stop disposed for engagement with the stop shoulder upon advancing the rod within the tube.

4. The transparent substrate repair assembly according to claim 1 wherein the extrusion tube further comprises a stop shoulder and the vacuum container further comprises an extrusion tube stop disposed for engagement with the tube shoulder upon advancing the tube within the vacuum container.

5. The transparent substrate repair assembly according to claim 1 wherein the extruding rod, extrusion tube and vacuum container each respectively further comprises a turning reference mark;

whereby the relative positioning of each with respect to the other may be determined and set.

6. The transparent substrate repair assembly according to claim 1 wherein the extrusion tube further comprises a draft ledge;

whereby the extraction of air and moisture from the resin is enhanced.

7. The transparent substrate repair assembly according to claim 1 wherein the compression grommet's second end comprises a thickened sector and a thinned sector;

whereby the grommet's compression is enhanced.

8. The transparent substrate repair assembly according to claim 1 further comprising an internally threaded lock-down nut comprising a plurality of promontories;

whereby, upon coengagement of the nut's internally disposed threads with the vacuum container's externally threaded sector and buttressing of the nut against the upper face of the apparatus platform, the vacuum container's advancement is thereby prevented.

9. The transparent substrate repair assembly according to claim 1 comprising a radial interference knob comprising an externally threaded sector configured substantially identical that of the vacuum container such that it may be disposed for coengagement with any one of the apparatus platform's threaded vacuum container openings; the assembly further comprising a radial interference projection wherein the interference knob comprises sufficient thickness and the radial interference projection is disposed to radially engage the interference knob, thereby providing a distal interference stop for the vacuum container;

whereby the container is prevented from advancing beyond a predetermined point and thereby damaging the substrate.

10. The transparent substrate repair assembly according to claim 1 wherein a portion of the apparatus platform is divided to comprise a curve following subplatform comprising:

pivoting means against the remaining portion of the platform;

wherein at least one of the apparatus platform's suction cup assemblies is disposed to support the subplatform;

whereby repair proximate or upon a curved sector of substrate is enhanced.

11. The transparent substrate repair assembly according to claim 1 wherein each of the ring seals of the extruding rod and the extrusion tube is disposed more distal the applicating end than the respective stop shoulder of either respectively.

12. The transparent substrate repair assembly according to claim 1 comprising a stabilizing pin and wherein the apparatus platform comprises a stabilization pin opening.

13. The transparent substrate repair assembly according to claim 8 further comprising a radial interference projection wherein the lock-down nut comprises sufficient thickness and the radial interference projection is disposed to radially engage one of the nuts promontories thereby providing a proximal interference stop for the vacuum container;

whereby the container is prevented from advancing beyond a predetermined point and thereby damaging the substrate.

14. The transparent substrate repair assembly according to claim 9 wherein the interference knob is further configured for engagement by the suction cup assembly's connecting means with the platform;

whereby part of the apparatus platform support may be provided at any vacuum container opening wherein an interference knob is disposed.

15. The transparent substrate repair assembly according to claim 9 wherein the vacuum producing assembly comprises a vacuum attachment conduit disposed to comprise the radial interference projection.

16. The transparent substrate repair assembly according to claim 10 wherein the subplatform comprises at least one of the apparatus platform's suction cup openings such that part of the apparatus platform support may be provided thereat by suction cup connection means comprising a bolt.

17. The transparent substrate repair assembly according to claim 10 wherein the subplatform comprises:

at least one of the apparatus platform's threaded openings configured such that the vacuum container or any other object configured with a substantially identical externally threaded sector may be disposed therethrough by interthreading; and a radial interference knob comprising an externally threaded sector identically configured to that of the vacuum container such that it may be disposed for coengagement with any one of the subplatform's threaded vacuum container openings.

18. The transparent substrate repair assembly according to claim 13 wherein the disposition of the penetrating attachment of the vacuum attachment conduit is transverse the longitudinal extension of the vacuum container and specifically comprises the radial interference projection.

19. The transparent substrate repair assembly according to claim 17 wherein the interference knob is further configured for engagement by the suction cup assembly's connecting means with the subplatform;

whereby part of the apparatus platform support may be provided at any subplatform vacuum container opening wherein an interference knob is disposed.

20. The transparent substrate repair assembly according to claim 10 wherein the suction cup assembly's connecting means comprises a bolt.

* * * * *

UNITED STATES PATENT AND TRADEMARK OFFICE
CERTIFICATE OF CORRECTION

PATENT NO. : 6,663,371 B2  Page 1 of 1
DATED : December 16, 2003
INVENTOR(S) : Michael J. Curl It is certified that error appears in the above-identified patent and that said Letters Patent is hereby corrected as shown below:

<u>Title page,</u>
Item [75], Inventors, the correct address for inventor "Michael J. Curl" is
-- 207 3rd Ave., #23
   Monroe WI 53566 --

Signed and Sealed this

Twenty-eighth Day of December, 2004

JON W. DUDAS
*Director of the United States Patent and Trademark Office*